United States Patent
Durocher (10) Patent No.: US 12,467,403 B1
(45) Date of Patent: Nov. 11, 2025

(54) POWERPLANT FUEL SYSTEM UTILIZING AMMONIA

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/759,194

(22) Filed: Jun. 28, 2024

(51) Int. Cl.
F02C 3/22 (2006.01)
F02C 7/224 (2006.01)
F02C 9/40 (2006.01)
F23R 3/36 (2006.01)

(52) U.S. Cl.
CPC ............... F02C 3/22 (2013.01); F02C 7/224 (2013.01); F02C 9/40 (2013.01); F23R 3/36 (2013.01)

(58) Field of Classification Search
CPC .... F02C 9/40; F02C 3/22; F02C 7/224; F02C 7/222; F23R 3/36; F23R 3/34; F23R 3/346; F23R 3/343; F23R 3/46; F23R 3/50
See application file for complete search history.

(56) References Cited

U.S. PATENT DOCUMENTS

| | | | |
|---|---|---|---|
| 11,746,704 B2 * | 9/2023 | Asai | F02C 9/40 |
| | | | 60/776 |
| 11,920,524 B2 | 3/2024 | Smith | |
| 2010/0170253 A1 * | 7/2010 | Berry | F23R 3/286 |
| | | | 60/742 |
| 2021/0332759 A1 | 10/2021 | Smith | |
| 2022/0154646 A1 * | 5/2022 | Araki | C01B 3/047 |
| 2022/0162989 A1 | 5/2022 | Cocks | |
| 2022/0162999 A1 * | 5/2022 | Cocks | C01B 3/047 |
| 2023/0015930 A1 * | 1/2023 | Meshkin Fam | B64D 37/30 |
| 2023/0258135 A1 | 8/2023 | Swann | |
| 2023/0258136 A1 | 8/2023 | Swann | |
| 2023/0258137 A1 | 8/2023 | Swann | |
| 2024/0102657 A1 | 3/2024 | Kapat | |
| 2024/0167417 A1 * | 5/2024 | Lin | F02C 3/22 |
| 2024/0209791 A1 * | 6/2024 | Madden | F23R 3/36 |

FOREIGN PATENT DOCUMENTS

| | | |
|---|---|---|
| CN | 107882638 B | 6/2020 |
| CN | 115387914 A | 11/2022 |
| CN | 117365739 A | 1/2024 |
| CN | 117404185 A | 1/2024 |
| WO | 2023281265 A1 | 1/2023 |

* cited by examiner

Primary Examiner — Gerald L Sung
Assistant Examiner — Jingchen Liu
(74) Attorney, Agent, or Firm — Getz Balich LLC (57) ABSTRACT

A method is provided for operating a powerplant. During this method, a hydrocarbon fuel is delivered to a turbine engine for combustion within a combustion chamber of the turbine engine during initial startup operation of the turbine engine. Ammonia is at least partially cracked into hydrogen gas and nitrogen gas. A non-hydrocarbon fuel is delivered to the turbine engine for combustion within the combustion chamber of the turbine engine during post-startup operation of the turbine engine. The non-hydrocarbon fuel is or otherwise includes the hydrogen gas or a combination of the hydrogen gas and the nitrogen gas.

15 Claims, 6 Drawing Sheets

POWERPLANT FUEL SYSTEM UTILIZING AMMONIA

TECHNICAL FIELD

This disclosure relates generally to a powerplant and, more particularly, to a fuel system for the powerplant utilizing ammonia.

BACKGROUND INFORMATION

Various fuel systems are known in the art for powerplants such as gas turbine engines, including fuel systems which utilize a non-hydrocarbon fuel such as ammonia. While these known fuel systems have various advantages, there is still room in the art for improvement.

SUMMARY

According to an aspect of the present disclosure, a method is provided for operating a powerplant. During this method, a hydrocarbon fuel is delivered to a turbine engine for combustion within a combustion chamber of the turbine engine during initial startup operation of the turbine engine. Ammonia is at least partially cracked into hydrogen gas and nitrogen gas. A non-hydrocarbon fuel is delivered to the turbine engine for combustion within the combustion chamber of the turbine engine during post-startup operation of the turbine engine. The non-hydrocarbon fuel is or otherwise includes the hydrogen gas or a combination of the hydrogen gas and the nitrogen gas.

According to another aspect of the present disclosure, another method is provided for operating a powerplant. During this method, a hydrocarbon fuel is delivered to an aircraft engine for combustion within the aircraft engine during startup operation of the aircraft engine. A non-hydrocarbon fuel is delivered to the aircraft engine for combustion within the aircraft engine during post-startup operation of the aircraft engine. The non-hydrocarbon fuel is not delivered to the aircraft engine for combustion within the aircraft engine during the startup operation of the aircraft engine. The hydrocarbon fuel is not delivered to the aircraft engine for combustion within the aircraft engine during one or more modes of the post-startup operation of the aircraft engine.

According to still another aspect of the present disclosure, a powerplant is provided that includes a turbine engine and a fuel system. The turbine engine includes a flowpath, a compressor section, a combustor section and a turbine section. The flowpath extends through the compressor section, the combustor section and the turbine section from an inlet into the flowpath to an exhaust from the flowpath. The combustor section includes a combustor with a combustion chamber. The fuel system is configured to deliver a hydrocarbon fuel to the combustor section for combustion within the combustion chamber during initial startup operation of the turbine engine. The fuel system is configured to deliver a non-hydrocarbon fuel to the combustor section for combustion within the combustion chamber during post-startup operation of the turbine engine. The fuel system is configured to at least partially crack ammonia into hydrogen gas and nitrogen gas. The non-hydrocarbon fuel is or otherwise includes the hydrogen gas or a combination of the hydrogen gas and the nitrogen gas.

The fuel system may include a first fuel injector and a second fuel injector. The fuel system may be configured to deliver the hydrocarbon fuel to the first fuel injector during the initial startup operation of the turbine engine. The fuel system may be configured to deliver the non-hydrocarbon fuel to the second fuel injector during the post-startup operation of the turbine engine.

The fuel system may include a fuel injector. The fuel system may be configured to deliver the hydrocarbon fuel to the fuel injector during the initial startup operation of the turbine engine. The fuel system may be configured to deliver the non-hydrocarbon fuel to the fuel injector during the post-startup operation of the turbine engine.

The method may also include at least partially cracking ammonia into hydrogen gas and nitrogen gas. The non-hydrocarbon fuel delivered to the aircraft engine for combustion may be the hydrogen gas or a combination of the hydrogen gas and the nitrogen gas.

The non-hydrocarbon fuel may be or otherwise include hydrogen gas.

The non-hydrocarbon fuel may be a derivative of ammonia.

The hydrocarbon fuel may be or otherwise include natural gas.

The hydrocarbon fuel may be or otherwise include kerosene.

The hydrocarbon fuel may be or otherwise include sustainable aviation fuel.

The non-hydrocarbon fuel may be/only include the hydrogen gas.

The non-hydrocarbon fuel may be/only include the combination of the hydrogen gas and the nitrogen gas.

The hydrocarbon fuel may not be delivered to the turbine engine during at least one mode of the post-startup operation of the turbine engine.

The non-hydrocarbon fuel may not be delivered to the turbine engine during the initial startup operation of the turbine engine.

The hydrocarbon fuel may be delivered to a first fuel injector for injection into the combustion chamber. The non-hydrocarbon fuel may be delivered to a second fuel injector for injection into the combustion chamber.

The first fuel injector may not receive the non-hydrocarbon fuel during at least one mode of the post-startup operation of the turbine engine.

The second fuel injector may not receive the hydrocarbon fuel during the initial startup operation of the turbine engine.

The hydrocarbon fuel and the non-hydrocarbon fuel may be delivered to a common fuel injector for injection into the combustion chamber.

The method may also include heating the ammonia at least one of prior to or during the at least partial cracking of the ammonia.

The method may also include separating uncracked ammonia from the hydrogen gas following the at least partial cracking of the ammonia.

The method may also include separating the uncracked ammonia from the nitrogen gas following the separating of the uncracked ammonia from the hydrogen gas.

The method may also include compressing the non-hydrocarbon fuel to increase a pressure of the non-hydrocarbon fuel prior to the delivering of the non-hydrocarbon fuel to the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
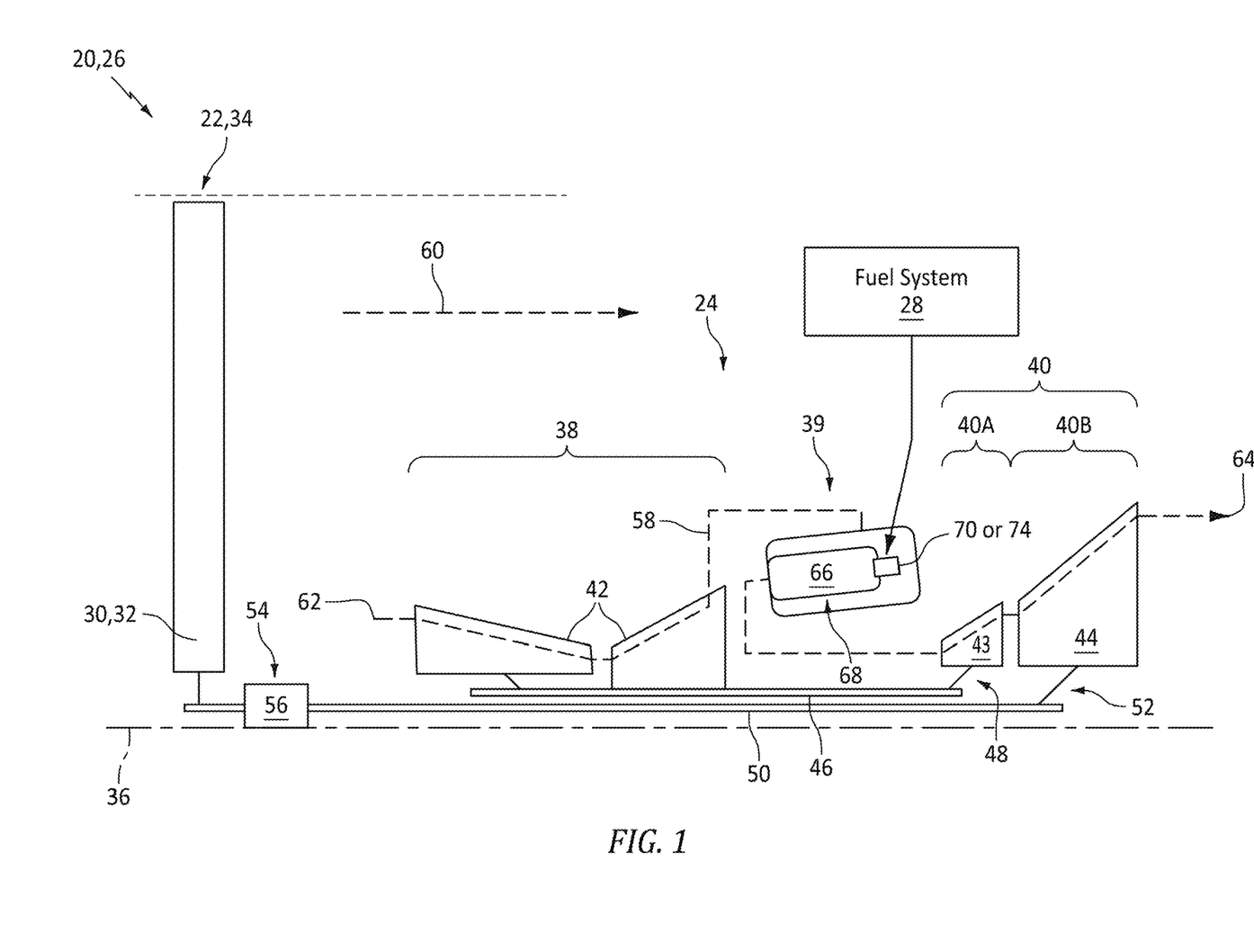
FIG. 1 is a partial schematic illustration of a powerplant for an aircraft.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), for aquatic operation, or otherwise. However, for ease of description, the powerplant 20 is described below as an aircraft powerplant.

The aircraft powerplant 20 of FIG. 1 includes a mechanical load 22 and a core 24 of a gas turbine engine 26, where the engine core 24 is configured to power operation of the mechanical load 22. The aircraft powerplant 20 also includes a fuel system 28 for the turbine engine 26 and its engine core 24.

The mechanical load 22 may be configured as or otherwise include a rotor 30 mechanically driven by the engine core 24. This driven rotor 30 may be a bladed propulsor rotor for the aircraft propulsion system. The propulsor rotor may be a ducted propulsor rotor or an open propulsor rotor; e.g., an un-ducted propulsor rotor. For example, where the turbine engine 26 is a turbofan engine, the ducted propulsor rotor may be a fan rotor 32. Where the turbine engine 26 is a turboprop engine, the open propulsor rotor may be a propeller rotor. Where the turbine engine 26 is a turboshaft engine, the open propulsor rotor may be a rotorcraft rotor such as a helicopter main rotor or a helicopter tail rotor. Alternatively, the driven rotor 30 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary turbine engines. The turbine engine 26, for example, may alternatively be configured as a turbojet engine, a propfan engine, a pusher fan engine or any other type of turbine engine operable to power the operation of the mechanical load 22. However, for ease of description, the mechanical load 22 is described below as a fan section 34 of the turbine engine 26, and the driven rotor 30 is described below as the fan rotor 32 within the fan section 34.

The turbine engine 26 extends axially along an axis 36 from a forward, upstream end of the turbine engine 26 to an aft, downstream end of the turbine engine 26. Briefly, this axis 36 may be a centerline axis of the turbine engine 26 and its members. The axis 36 may also be a rotational axis of one or more members of the turbine engine 26 and its engine core 24 including the fan rotor 32—the driven rotor 30. The turbine engine 26 of FIG. 1 includes the fan section 34, a compressor section 38, a combustor section 39 and a turbine section 40. The turbine section 40 of FIG. 1 includes a high pressure turbine (HPT) section 40A and a low pressure turbine (LPT) section 40B, which LPT section 40B of FIG. 1 is a power turbine (PT) section for driving rotation of the fan rotor 32.

The compressor section 38 includes a compressor rotor 42. The HPT section 40A includes a high pressure turbine (HPT) rotor 43. The LPT section 40B includes a low pressure turbine (LPT) rotor 44. The fan rotor 32, the compressor rotor 42, the HPT rotor 43 and the LPT rotor 44 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 42 is coupled to and rotatable with the HPT rotor 43. The compressor rotor 42 of FIG. 1, for example, is connected to the HPT rotor 43 by a high speed shaft 46. At least (or only) the compressor rotor 42, the HPT rotor 43 and the high speed shaft 46 collectively form a high speed rotating assembly 48; e.g., a high speed spool of the engine core 24.

The LPT rotor 44 of FIG. 1 is connected to a low speed shaft 50. At least (or only) the LPT rotor 44 and the low speed shaft 50 collectively form a low speed rotating assembly 52; e.g., a low speed spool/a power turbine spool of the engine core 24. This low speed rotating assembly 52 is further coupled to the fan rotor 32—the driven rotor 30—through a drivetrain 54. This drivetrain 54 may be configured as a geared drivetrain, where a geartrain 56 (e.g., a transmission, a speed change device, an epicyclic geartrain, etc.) is disposed between and operatively couples the fan rotor 32 to the low speed rotating assembly 52 and its LPT rotor 44. With this arrangement, the fan rotor 32 may rotate at a different (e.g., slower) rotational velocity than the low speed rotating assembly 52 and its LPT rotor 44. However, the drivetrain 54 may alternatively be configured as a direct drive drivetrain, where the geartrain 56 is omitted. With such an arrangement, the fan rotor 32 rotates at a common (the same) rotational velocity as the low speed rotating assembly 52 and its LPT rotor 44. Referring again to FIG. 1, each of the rotating assemblies 48, 52 and its members as well as the fan rotor 32 may be rotatable about the axis 36.

The turbine engine 26 of FIG. 1 includes a (e.g., annular) core flowpath 58 and a (e.g., annular) bypass flowpath 60. Here, the bypass flowpath 60 is a ducted flowpath within the aircraft powerplant 20 and its turbine engine 26. The bypass flowpath 60, however, may alternatively be an open flowpath where the driven rotor 30 is alternatively configured as the open propulsor rotor, or the bypass flowpath 60 may be omitted where the driven rotor 30 is alternatively configured as the generator rotor. Referring again to FIG. 1, the core flowpath 58 extends within the turbine engine 26 and its engine core 24 from an airflow inlet 62 into the core flowpath 58 to a combustion products exhaust 64 from the core flowpath 58. More particularly, the core flowpath 58 extends from the core inlet 62, sequentially through the compressor section 38, the combustor section 39, the HPT section 40A and the LPT section 40B, to the core exhaust 64.

The bypass flowpath 60 of FIG. 1 extends outside of the engine core 24 thereby bypassing the engine core 24 and its engine sections 38-40B.

During operation of the turbine engine 26, air is directed across the fan rotor 32 (e.g., the propulsor rotor) and into the engine core 24 through the core inlet 62. This air entering the core flowpath 58 may be referred to as core air. The core air is compressed by the compressor rotor 42 and directed into a combustion chamber 66 (e.g., an annular combustion chamber) within a combustor 68 (e.g., an annular combustor) of the combustor section 39. Fuel is injected into the combustion chamber 66 and mixed with the compressed core air to provide a fuel-air mixture. This fuel-air mixture is ignited and combustion products thereof flow through and sequentially drive rotation of the HPT rotor 43 and the LPT rotor 44. The rotation of the HPT rotor 43 drives rotation of the compressor rotor 42 and, thus, the compression of the air received from the core inlet 62. The rotation of the LPT rotor 44 drives rotation of the fan rotor 32—the driven rotor 30. The rotation of the fan rotor 32 propels some of the air flow thereacross (e.g., the air not entering the engine core 24) through the bypass flowpath 60 to provide engine thrust. Of course, where the driven rotor 30 is alternatively configured as the open propulsor rotor, the rotation of this open propulsor rotor may propel air outside of the aircraft powerplant 20 and its turbine engine 26. Where the driven rotor 30 is alternatively configured as the generator rotor, the rotation of this generator rotor may facilitate generation of electricity.

Figure 2:
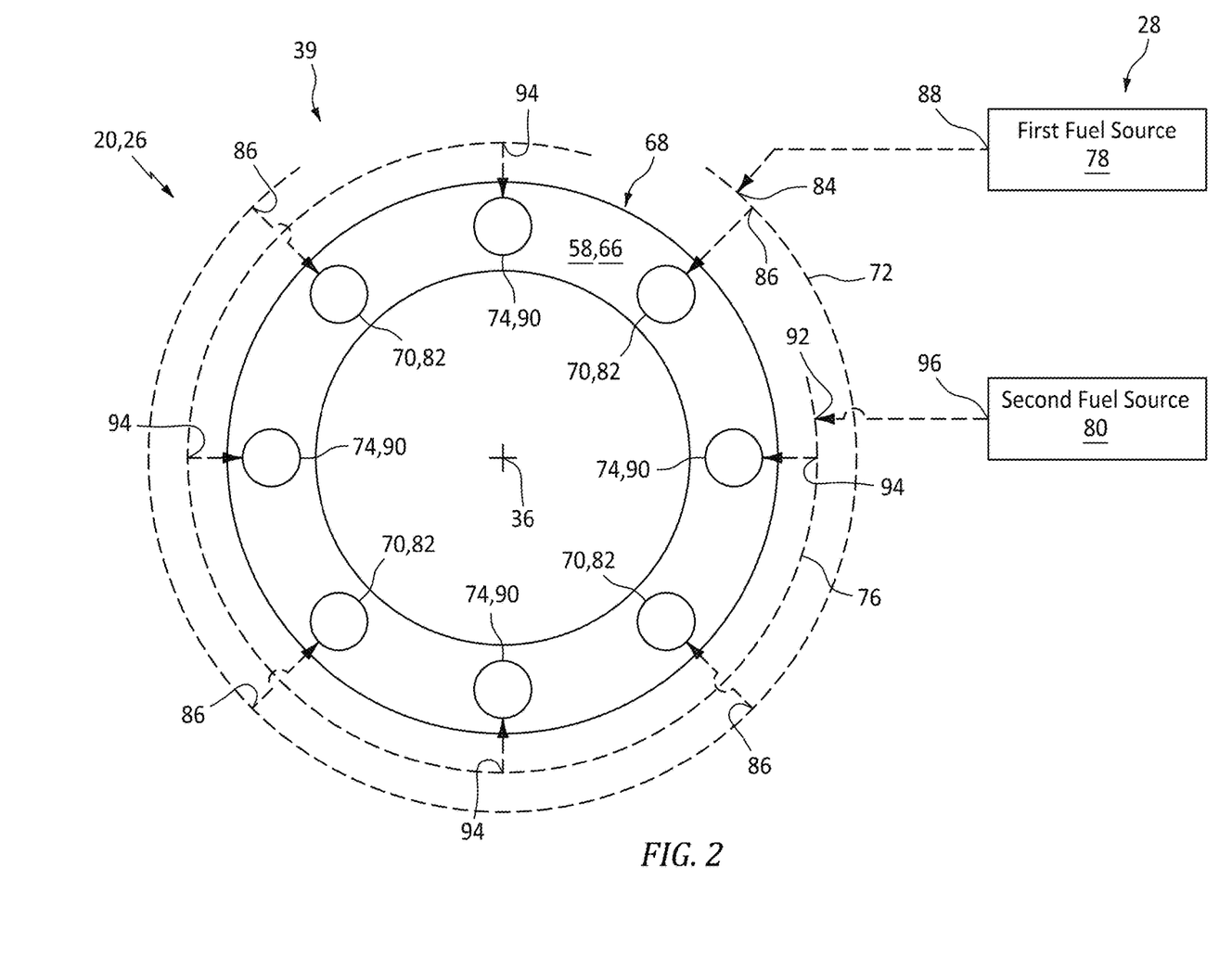
FIG. 2 is a partial schematic illustration of a fuel system with a turbine engine combustor.

Referring to FIG. 2, the fuel system 28 is configured to deliver the fuel to the combustor 68 for combustion. The fuel system 28 of FIG. 2, for example, includes one or more first fuel injectors 70 and an associated first fuel manifold 72, one or more second fuel injectors 74 and an associated second fuel manifold 76, a first fuel source 78 and a second fuel source 80.

The first fuel injectors 70 of FIG. 2 are arranged and may be equispaced circumferentially about the axis 36 in an annular array; e.g., a circular array. Each of these first fuel injectors 70 is configured to inject first fuel into the combustion chamber 66. Each of the first fuel injectors 70, for example, may include a first fuel nozzle 82 which projects partially into the combustion chamber 66 to a tip of the first fuel nozzle 82. Alternatively, the first fuel nozzle 82 and its nozzle tip may be arranged upstream of the combustion chamber 66, but in fluid communication with the combustion chamber 66 through, for example, a bore of an air swirler assembly or the like.

The first fuel manifold 72 of FIG. 2 extends circumferentially about (e.g., partially or completely around) the axis 36. This first fuel manifold 72 fluidly couples the first fuel source 78 to the first fuel injectors 70. The first fuel manifold 72 of FIG. 2, for example, includes an inlet 84 into the first fuel manifold 72 and one or more outlets 86 from the first fuel manifold 72 (here, one first manifold outlet 86 for each first fuel injector 70). The first manifold inlet 84 is downstream of and fluidly coupled with an outlet 88 from the first fuel source 78. Each first manifold outlet 86 is upstream of and is fluidly coupled to an inlet of a respective one of the first fuel injectors 70.

The second fuel injectors 74 of FIG. 2 are arranged and may be equispaced circumferentially about the axis 36 in an annular array; e.g., a circular array. Each of these second fuel injectors 74 is configured to inject second fuel into the combustion chamber 66. Each of the second fuel injectors 74, for example, may include a second fuel nozzle 90 which projects partially into the combustion chamber 66 to a tip of the second fuel nozzle 90. Alternatively, the second fuel nozzle 90 and its nozzle tip may be arranged upstream of the combustion chamber 66, but in fluid communication with the combustion chamber 66 through, for example, a bore of an air swirler assembly or the like.

The second fuel injectors 74 are shown in FIG. 2 as being circumferentially interspersed with the first fuel injectors 70. Each second fuel injector 74 of FIG. 2, for example, is disposed circumferentially between a respective circumferentially neighboring pair of the first fuel injectors 70. Each first fuel injector 70 of FIG. 2 is disposed circumferentially between a respective circumferentially neighboring pair of the second fuel injectors 74. The present disclosure, however, is not limited to such an exemplary arrangement. Each second fuel injector 74, for example, may be circumferentially aligned with (e.g., radially inward of or outward of) a respective one of the first fuel injectors 70. Moreover, while the combustor section 39 of FIG. 2 is shown with a one-to-one relationship between the first fuel injectors 70 and the second fuel injectors 74, it is contemplated there may be more or less of the second fuel injectors 74 than the first fuel injectors 70.

The second fuel manifold 76 of FIG. 2 extends circumferentially about (e.g., partially or completely around) the axis 36. This second fuel manifold 76 fluidly couples the second fuel source 80 to the second fuel injectors 74. The second fuel manifold 76 of FIG. 2, for example, includes an inlet 92 into the second fuel manifold 76 and one or more outlets 94 from the second fuel manifold 76 (here, one second manifold outlet 94 for each second fuel injector 74). The second manifold inlet 92 is downstream of and fluidly coupled with an outlet 96 from the second fuel source 80. Each second manifold outlet 94 is upstream of and is fluidly coupled to an inlet of a respective one of the second fuel injectors 74.

Figure 3:
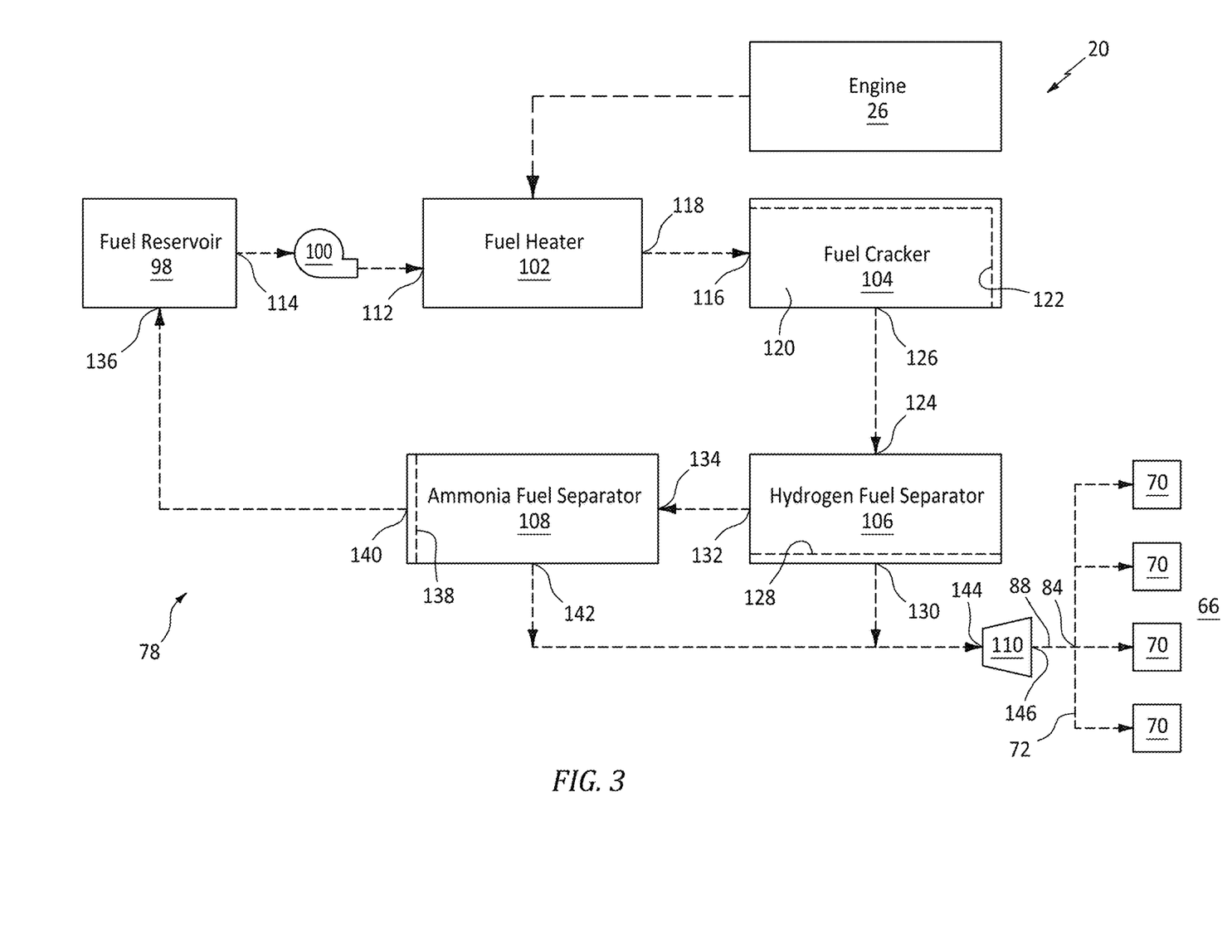
FIG. 3 is a schematic illustration of the fuel system with the turbine engine depicting details of a first fuel source.

Referring to FIG. 3, the first fuel source 78 is configured to output a flow of the first fuel to the first fuel manifold 72 and, thus, the first fuel injectors 70. This first fuel output by the first fuel source 78 is a non-hydrocarbon fuel, and may be substantially or completely in a gaseous phase. The first fuel output from the first fuel source 78 may thereby be a gaseous non-hydrocarbon fuel. The first fuel, for example, may be/(e.g., substantially or only) include hydrogen gas; e.g., $H_2$ gas. Alternatively, the first fuel may include the hydrogen gas along with nitrogen gas; e.g., a mixture of $H_2$ gas and $N_2$ gas. The first fuel source 78 of FIG. 3 includes a first fuel reservoir 98 (e.g., an ammonia reservoir), a first fuel pump 100, a fuel heater 102, a fuel cracker 104 and one or more fuel separators 106 and 108. This first fuel source 78 may also include a fuel compressor 110; e.g., a fuel pressure boosting device.

The first fuel reservoir 98 may be configured as or otherwise includes a container such as, but not limited to, a tank, a cylinder, a pressure vessel or a bladder. This first fuel reservoir 98 is configured to contain, hold and store a quantity of ammonia ($NH_3$). The ammonia stored within the first fuel reservoir 98 may be substantially or completely in a liquid phase; e.g., liquid ammonia.

An inlet 112 into the fuel heater 102 is downstream from and is fluidly coupled to an outlet 114 from the first fuel reservoir 98 through the first fuel pump 100. This fuel heater 102 is configured to heat the liquid ammonia output from the first fuel reservoir 98 partially or completely into a gaseous phase. The fuel heater 102, for example, may vaporize some or all of the liquid ammonia received from the first fuel reservoir 98 via the first fuel pump 100 into gaseous ammonia; e.g., $NH_3$ gas.

The fuel heater 102 may be configured as a heat exchanger which receives heat energy generated by the turbine engine 26 during operation thereof, and transfers some or all of that heat energy into the ammonia. The heat exchanger, for example, may receive a working fluid from the turbine engine 26 of FIG. 1. This working fluid may be compressed core air bled from the core flowpath 58 along or downstream of the compressor section 38. Alternatively, the working fluid may be combustion products bled from the core flowpath 58 along or downstream of the combustor 68 and, more particularly, along or downstream of the turbine section 40. Alternatively, the working fluid may be a fluid used for cooling one or more components of the turbine engine 26 following the cooling of the respective engine component(s); e.g., now heated cooling air, heated lubricant, heated fuel, etc. Still alternatively, the working fluid may be an intermediate fluid which draws heat energy out of one or more components of the turbine engine 26 during cooling and/or lubricating the respective engine component(s); e.g., lubricant, coolant, heat transfer fluid, etc. The present disclosure, however, is not limited to such exemplary working fluids nor to such exemplary heat sources for generating the heat energy within the turbine engine 26. Moreover, while the fuel heater 102 of FIG. 3 is generally described herein as a fluid-to-fluid heat exchanger—a working fluid-to-ammonia heat exchanger—the present disclosure is not limited to such an exemplary fuel heater configuration. The fuel heater 102, for example, may alternatively be configured as (or also include) an electric heater or any other type of heater capable of raising a temperature of (e.g., and vaporizing) the ammonia. Moreover, while the first fuel source 78 of FIG. 3 is shown with a single fuel heater 102, it is contemplated the fuel heater 102 may be one or multiple fuel heaters fluidly coupled between the first fuel reservoir 98 and the fuel cracker 104 (or with the fuel cracker 104).

An inlet 116 into the fuel cracker 104 is downstream from and is fluidly coupled to an outlet 118 from the fuel heater 102. This fuel cracker 104 is configured to facilitate at least partial or complete cracking (e.g., decomposition) of the ammonia (e.g., the gaseous ammonia) received from the fuel heater 102 into the hydrogen gas and the nitrogen gas. A passage 120 through the fuel cracker 104, for example, may be at least partially or completely lined, coated and/or otherwise formed by at least one catalyst 122. The passage 120 may also or alternatively be partially filled with a porous catalyst-containing material such as pellets or honeycomb. Examples of the catalyst 122 include, but are not limited to, nickel (Ni), iron (Fe), ruthenium (Ru), platinum (Pt) or an alloy including any one or more of the foregoing metals. The ammonia gas may thereby flow along, contact and interact with the catalyst 122 as it flows in the fuel cracker 104 and its passage 120, where the interaction between the ammonia gas and the catalyst 122 facilitates at least partial or complete cracking of the ammonia gas into the hydrogen gas and the nitrogen gas. While the fuel cracker 104 is shown in FIG. 3 as a separate element from the fuel heater 102, it is contemplated the fuel heater 102 and the fuel cracker 104 may alternatively be combined into a single device. Alternatively, it is contemplated the fuel cracker 104 may also be a heater configured to further heat the ammonia during the cracking process.

An inlet 124 into the hydrogen fuel separator 106 is downstream from and is fluidly coupled to an outlet 126 from the fuel cracker 104 (or an outlet from a combination fuel heater/fuel cracker). This hydrogen fuel separator 106 is configured to separate the at least partially (or completely) cracked ammonia into two or more groupings. For example, following the partial cracking of the ammonia via the fuel cracker 104, the hydrogen fuel separator 106 may receive the (remaining/uncracked) ammonia gas, the hydrogen gas and the nitrogen gas. The hydrogen fuel separator 106 may separate these components into two groupings. The first grouping may be/(e.g., substantially or only) include the hydrogen gas. The second grouping may be/(e.g., substantially or only) include a mixture of the (remaining/uncracked) ammonia gas and the nitrogen gas. However, it is contemplated the first grouping may alternatively further include the nitrogen gas, and the second grouping may be (e.g., substantially or only) the remaining uncracked ammonia gas.

To separate the at least partially (or completely) cracked ammonia into the first and the second groupings, the hydrogen fuel separator 106 may include a hydrogen permeable membrane 128. This hydrogen permeable membrane 128 is configured to separate at least some of the first group (e.g., the hydrogen gas) from the second group (e.g., the nitrogen gas and any remaining ammonia gas). The hydrogen permeable membrane 128 may be constructed from or otherwise include one or more Group V metals such as palladium (Pd), alloys of palladium with other metals such as silver (Ag) or copper (Cu), or one or more other materials with high permeability of hydrogen gas as compared to ammonia gas and nitrogen gas.

A first outlet 130 from the hydrogen fuel separator 106 is upstream of and is fluidly coupled to the outlet 88 from the first fuel source 78/the first manifold inlet 84. This first outlet 130 from the hydrogen fuel separator 106 directs the separated hydrogen gas to the outlet 88 from the first fuel source 78/the first manifold inlet 84. A second outlet 132 from the hydrogen fuel separator 106 is upstream of and fluidly coupled to an inlet 134 into the ammonia fuel separator 108. This second outlet 132 from the hydrogen fuel separator 106 directs the remaining nitrogen gas and/or ammonia gas to the inlet 134 of the ammonia fuel separator 108. Alternatively, it is contemplated the first outlet 130 from the hydrogen fuel separator 106 may be the outlet 88 from the first fuel source 78 where, for example, the ammonia fuel separator 108 is omitted or alternatively configured within the first fuel source 78. In such embodiments, the second outlet 132 from the hydrogen fuel separator 106 may alternatively be upstream of and fluidly coupled to a return 136 (e.g., an inlet) into the first fuel reservoir 98.

The ammonia fuel separator 108 is configured to separate any remaining ammonia gas from the nitrogen gas. The ammonia fuel separator 108, for example, may include an ammonia permeable membrane 138. This ammonia permeable membrane 138 is configured to separate at least some of the remaining ammonia gas from the nitrogen gas. The ammonia permeable membrane 138 may be formed from one or more polymers, zeolites, or other materials with high permeability of ammonia gas as compared to hydrogen gas or nitrogen gas.

A first outlet 140 from the ammonia fuel separator 108 is upstream of and is fluidly coupled to the return 136 of the first fuel reservoir 98. This first outlet 140 from the ammonia fuel separator 108 directs the separated ammonia gas back to the first fuel reservoir 98 for storage and then reuse. A second outlet 142 from the ammonia fuel separator 108 is upstream of and is fluidly coupled to the outlet 88 from the first fuel source 78. The outlet 88 from the first fuel source 78 may thereby be configured to output a combination of the hydrogen gas and the nitrogen gas from the first fuel source 78. Alternatively, it is contemplated the nitrogen gas may be routed elsewhere for storage and/or alternative use.

The compressor 110 is configured to increase a pressure of the first fuel flowing to the outlet 88 from the first fuel source 78/the first manifold inlet 84. The compressor 110 of FIG. 3 is fluidly coupled (e.g., serially) inline between (a) the hydrogen fuel separator 106 and/or the ammonia fuel separator 108 and (b) the outlet 88 from the first fuel source 78/the first manifold inlet 84. An inlet 144 into the compressor 110 of FIG. 3, for example, is fluidly coupled with and is downstream of the first outlet 130 from the hydrogen fuel separator 106 and/or the second outlet 142 from the ammonia fuel separator 108. An outlet 146 from the compressor 110 is fluidly coupled with and is upstream of (or may be) the outlet 88 from the first fuel source 78.

Figure 4:
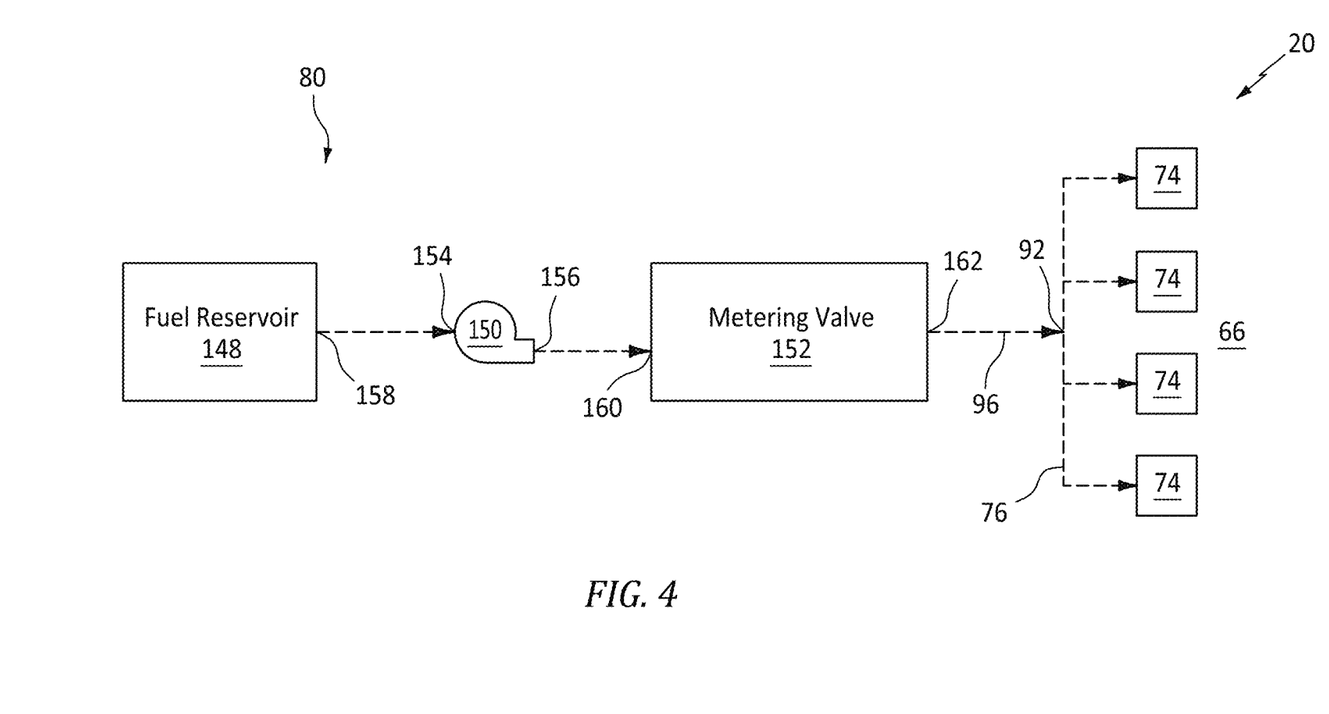
FIG. 4 is a schematic illustration of the fuel system with the turbine engine depicting details of a second fuel source.

Referring to FIG. 4, the second fuel source 80 is configured to output a flow of the second fuel to the second fuel manifold 76 and, thus, the second fuel injectors 74. This second fuel output by the second fuel source 80 may be a hydrocarbon fuel, and may be substantially or completely in a liquid phase or a gaseous phase depending upon the specific type of hydrocarbon fuel utilized. The second fuel output from the second fuel source 80 may thereby be a liquid hydrocarbon fuel, a gaseous hydrocarbon fuel or a mixed phase (e.g., liquid and gaseous) hydrocarbon fuel. The second fuel, for example, may be/(e.g., substantially or only) include liquid and/or gaseous sustainable aviation fuel (SAF), liquid and/or gaseous kerosene, liquid and/or gaseous natural gas, liquid and/or gaseous propane, or another aviation fuel. Examples of the sustainable aviation fuel include fuels produced using material(s) such as, but not limited to, corn grain, oil seeds, algae, fats, oils, greases, agricultural residue, forestry residue, wood mill waste, municipal solid waste streams, wet wastes (e.g., manure, wastewater treatment sludge, etc.) and dedicated energy crops.

The second fuel source 80 of FIG. 4 includes a second fuel reservoir 148, a second fuel pump 150 and a fuel metering valve 152. For ease of description, this second fuel source 80 is described below as storing the second fuel within the second fuel reservoir 148 in the liquid phase and then outputting the second fuel from the outlet 96 of the second fuel source 80 in the liquid phase. It is contemplated, however, the second fuel may alternatively be stored within the second fuel reservoir 148 in the gaseous phase and then output from the outlet 96 of the second fuel source 80 in the gaseous phase. It is also contemplated the second fuel may alternatively be stored within the second fuel reservoir 148 in the liquid phase and then output from the outlet 96 of the second fuel source 80 in the gaseous phase. The second fuel source 80, for example, may also include a fuel heater (e.g., a vaporizer) such that the liquid second fuel output from the second fuel reservoir 148 may be vaporized into the gaseous second fuel, or mixed phase second fuel, prior to being output from the outlet 96 of the second fuel source 80.

The second fuel reservoir 148 may be configured as or otherwise includes a container such as, but not limited to, a tank, a cylinder, a pressure vessel or a bladder. This second fuel reservoir 148 is configured to contain, hold and store a quantity of the second fuel; e.g., the hydrocarbon fuel. The second fuel stored within the second fuel reservoir 148 may be substantially or completely in the liquid phase (or alternatively in the gaseous phase or the mixed phase).

The second fuel pump 150 is fluidly coupled (e.g., serially) inline between the second fuel reservoir 148 and the metering valve 152. The second fuel pump 150 of FIG. 4, for example, includes an inlet 154 into the second fuel pump 150 and an outlet 156 from the second fuel pump 150. The inlet 154 of the second fuel pump 150 is downstream of and is fluidly coupled to an outlet 158 from the second fuel reservoir 148. The outlet 156 of the second fuel pump 150 is upstream of and is fluidly coupled to an inlet 160 into the metering valve 152.

The metering valve 152 is fluidly coupled (e.g., serially) inline between the second fuel reservoir 148 and the second manifold inlet 92. The inlet 160 of the metering valve 152 of FIG. 4, for example, is downstream of and is fluidly coupled to (through the second fuel pump 150) the outlet 158 from the second fuel reservoir 148. An outlet 162 from the metering valve 152 is upstream of and is fluidly coupled to (or may be) the outlet 96 from the second fuel source 80. This metering valve 152 is configured to meter (e.g., regulate) the flow of the second fuel (e.g., the hydrocarbon) from the second fuel reservoir 148 to the second fuel manifold 76 and, thus, the second fuel injectors 74. The metering valve 152, for example, may fully open to permit the second fuel to flow therethrough unimpeded. The metering valve 152 may partially open to permit a limited flow the second fuel therethrough. The metering valve 152 may also close to reduce second fuel flow therethrough to a minimum (but, non-zero) level. Here, even in its closed position, the metering valve 152 may continue to fluidly couple the second fuel reservoir 148 to the second fuel manifold 76, albeit with a minimum flowrate. In other embodiments, however, is it contemplated the metering valve 152 may alternatively (e.g., completely) fluidly decouple the second fuel reservoir 148 from the second fuel manifold 76 and, thus, the second fuel injectors 74.

The fuel system 28 may operate in various modes of operation. These operating modes may include a startup operating mode and a post-startup operating mode (or modes). During the startup operating mode, the fuel system 28 is operated to facilitate startup of the turbine engine 26 of FIG. 1. For example, prior to turbine engine operation, the turbine engine 26 may not generate any of the heat energy used for cracking the ammonia gas into the hydrogen gas and the nitrogen gas. Moreover, during the initial startup of the turbine engine 26, the turbine engine 26 may not generate enough of the heat energy for cracking the ammonia gas into the hydrogen gas and the nitrogen gas. Therefore, during the startup operating mode, the fuel system 28 is operated to deliver the second fuel—the hydrocarbon fuel—from the second fuel source 80 to the turbine engine 26 and its second fuel injectors 74. During at least an initial portion or an entirety of this startup operating mode, the fuel system 28 may not provide any of the first fuel—the non-hydrocarbon fuel—to the turbine engine 26 and its first fuel injectors 70. By contrast, during normal steady-state and/or transient-state operation of the turbine engine 26, the turbine engine 26 may generate enough of the heat energy to facilitate the cracking of the ammonia gas into the hydrogen gas and the nitrogen gas. Therefore, during the post-startup operating mode(s), the fuel system 28 is operated to deliver the hydrogen gas and the nitrogen gas (or just the hydrogen gas) from the first fuel source 78 to the turbine engine 26 and its first fuel injectors 70. During at least one of the post-startup operating mode(s), the fuel system 28 may not provide any of the second fuel to the turbine engine 26 and its second fuel injectors 74 thereby reducing (e.g., government regulated) emissions generated by the turbine engine 26.

Figure 5:
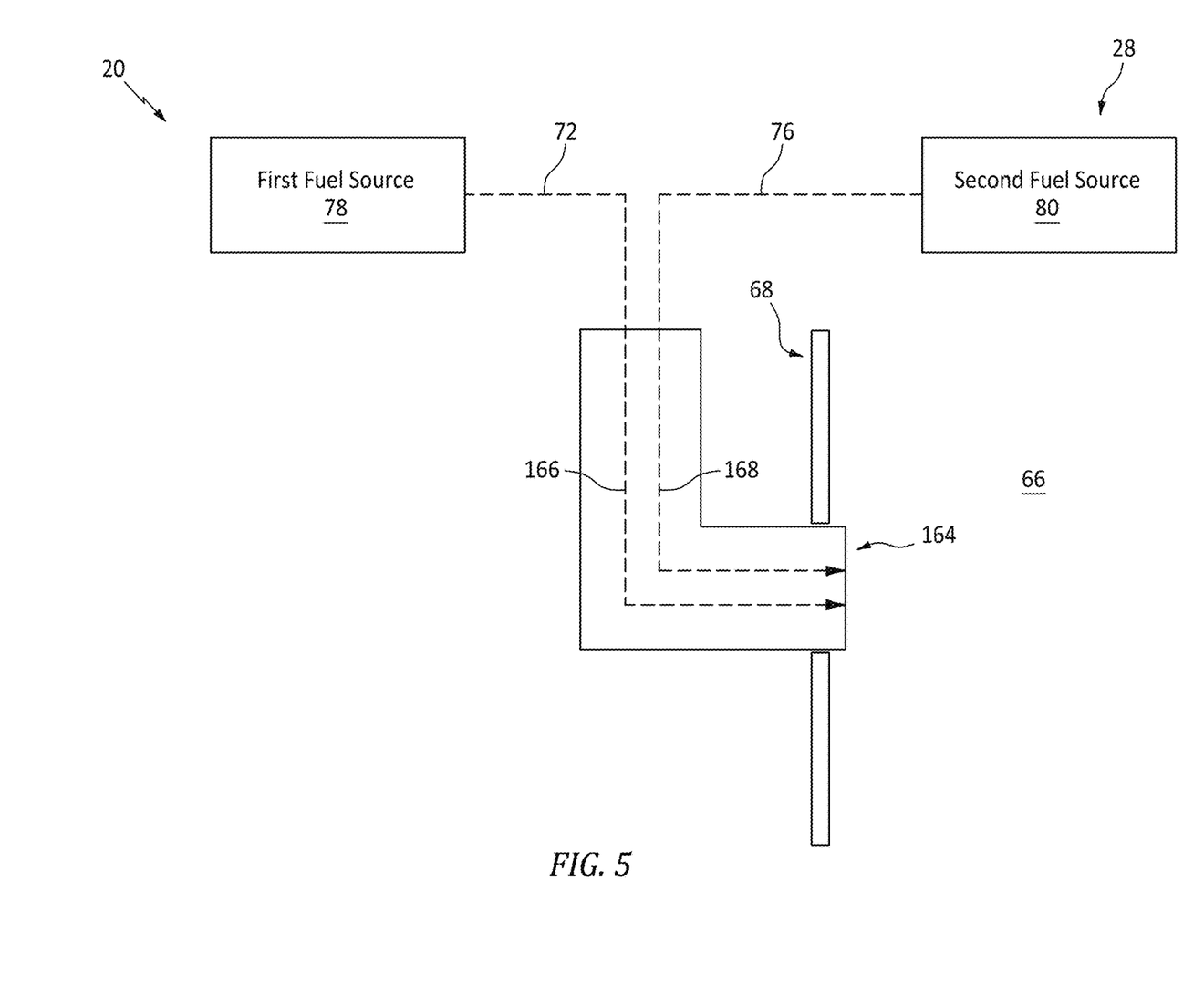
FIGS. 5 and 6 are schematic illustrations of the first fuel source and the second fuel source fluidly coupled to a common fuel injector with various arrangements.
Figure 6:
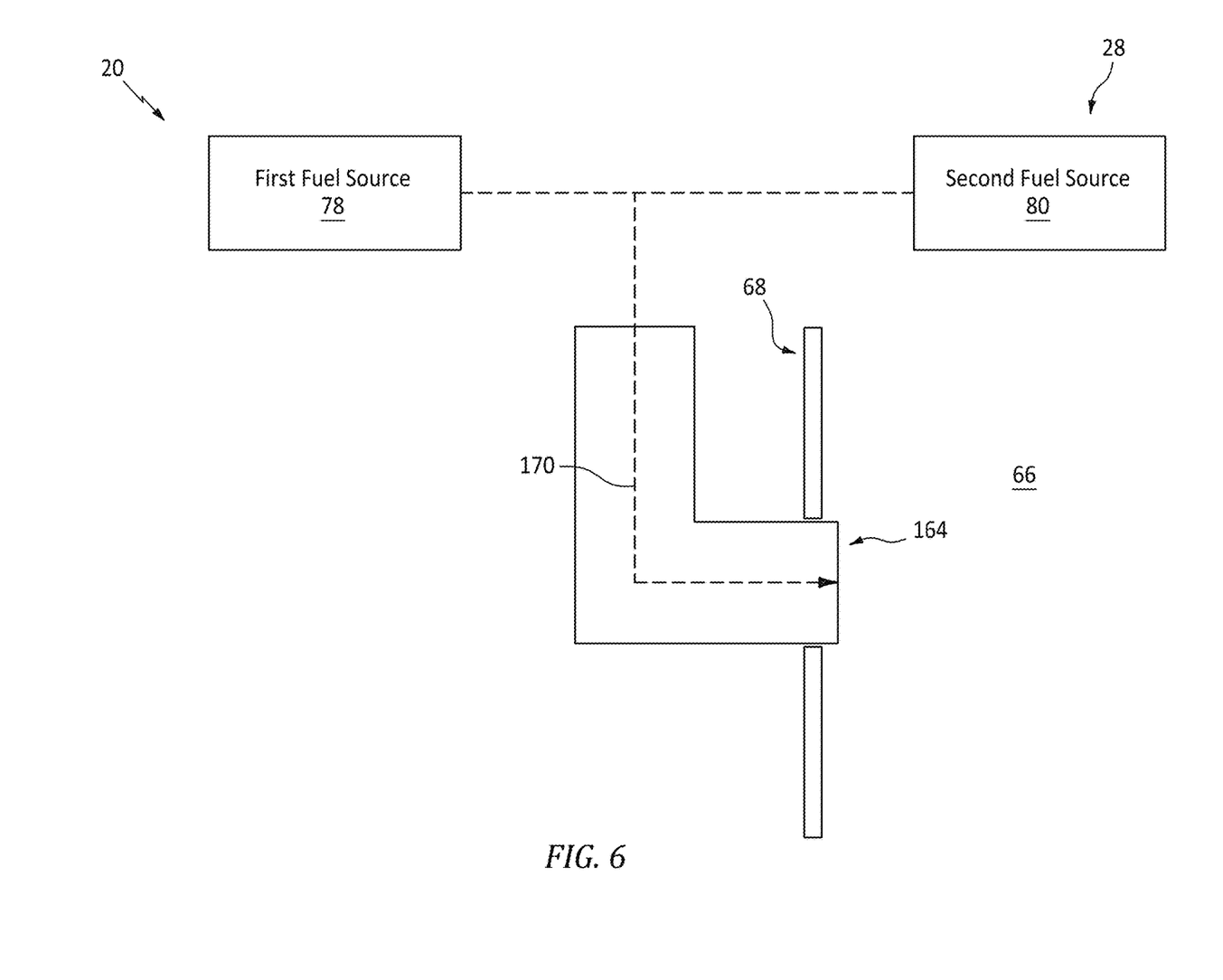

In some embodiments, referring to FIG. 2, the first fuel source 78 is fluidly decoupled from the second fuel manifold 76 and the second fuel injectors 74. The second fuel source 80 is also (or alternatively) fluidly decoupled from the first fuel manifold 72 and the first fuel injectors 70. In other embodiments, referring to FIGS. 5 and 6, the first fuel source 78 and the second fuel source 80 may share one or more common fuel injectors 164 (one shown in FIGS. 5 and 6 for ease of illustration). For example, referring to FIG. 5, each fuel injector 164 may include a first fuel circuit 166 and a second fuel circuit 168. The first fuel circuit 166 is fluidly coupled to the first fuel source 78 through the first fuel manifold 72, and this first fuel circuit 166 is configured to inject the first fuel into the combustion chamber 66. The second fuel circuit 168 is fluidly coupled to the second fuel source 80 through the second fuel manifold 76, and this second fuel circuit 168 is configured to inject the second fuel into the combustion chamber 66. In another example, referring to FIG. 6, each fuel injector 164 may include a common fuel circuit 170 which is fluidly coupled to both the first fuel source 78 and the second fuel source 80. This common fuel circuit 170 is thereby configured to inject the second fuel into the combustion chamber 66 during the startup operating mode, and inject the first fuel into the combustion chamber 66 during the post-startup operating mode(s). The present disclosure, however, is not limited to the foregoing exemplary fuel injector arrangements.

The fuel system 28 may be configured with various types of internal combustion engines. The fuel system 28, for example, may be configured with a gas turbine engine as described above. While the turbine engine 26 is described above with two rotating structures (e.g., two spools), it is contemplated the turbine engine 26 may alternatively be configured with a single rotating structure or more than two rotating structures. Moreover, it is contemplated the fuel system 28 may alternatively be configured with various other types of internal combustion engines such as, but not limited to, a rotary engine (e.g., a Wankel engine), a reciprocating piston engine, etc. The present disclosure therefore is not limited to any particular type of internal combustion engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating a powerplant, comprising:
   delivering a hydrocarbon fuel to a first plurality of fuel injectors of a turbine engine for injection and combustion within a combustion chamber of the turbine engine during initial startup operation of the turbine engine, the first plurality of fuel injectors being equispaced circumferentially about an axis;
   at least partially cracking ammonia into hydrogen gas and nitrogen gas; and
   delivering a non-hydrocarbon fuel to a second plurality of fuel injectors of the turbine engine for injection and combustion within the combustion chamber of the turbine engine during post-startup operation of the turbine engine, the non-hydrocarbon fuel comprising the hydrogen gas or a combination of the hydrogen gas and the nitrogen gas, and the second plurality of fuel injectors being circumferentially equispaced, interspersed with, and aligned to the first plurality of fuel injectors about the axis,
   wherein the second plurality of fuel injectors does not receive the hydrocarbon fuel during the initial startup operation of the turbine engine.

2. The method of claim 1, wherein the hydrocarbon fuel comprises natural gas.

3. The method of claim 1, wherein the hydrocarbon fuel comprises kerosene.

4. The method of claim 1, wherein the hydrocarbon fuel comprises sustainable aviation fuel.

5. The method of claim 1, wherein the non-hydrocarbon fuel consists of the hydrogen gas.

6. The method of claim 1, wherein the non-hydrocarbon fuel consists of the combination of the hydrogen gas and the nitrogen gas.

7. The method of claim 1, wherein the hydrocarbon fuel is not delivered to the turbine engine during at least one mode of the post-startup operation of the turbine engine.

8. The method of claim 1, wherein the non-hydrocarbon fuel is not delivered to the turbine engine during the initial startup operation of the turbine engine.

9. The method of claim 1, wherein the first plurality of fuel injectors does not receive the non-hydrocarbon fuel during at least one mode of the post-startup operation of the turbine engine.

10. The method of claim 1, further comprising heating the ammonia at least one of prior to or during the at least partial cracking of the ammonia.

11. The method of claim 1, further comprising separating at least an uncracked ammonia from the hydrogen gas following the at least partial cracking of the ammonia.

12. The method of claim 11, wherein the non-hydrocarbon fuel comprises the combination of the hydrogen gas and the nitrogen gas, and further comprising separating the uncracked ammonia from the nitrogen gas following the separating of the at least the uncracked ammonia from the hydrogen gas.

13. The method of claim 1, further comprising compressing the non-hydrocarbon fuel to increase a pressure of the non-hydrocarbon fuel prior to the delivering of the non-hydrocarbon fuel to the turbine engine.

14. A method for operating a powerplant, comprising:
    delivering a hydrocarbon fuel to a first plurality of fuel injectors of an aircraft engine for injection and combustion within the aircraft engine during startup operation of the aircraft engine, the first plurality of fuel injectors being disposed circumferentially about an axis; and
    delivering a non-hydrocarbon fuel to a second plurality of fuel injectors of the aircraft engine for injection and combustion within the aircraft engine during post-startup operation of the aircraft engine, wherein the non-hydrocarbon fuel is not delivered to the aircraft engine for combustion within the aircraft engine during the startup operation of the aircraft engine, the hydrocarbon fuel is not delivered to the aircraft engine for combustion within the aircraft engine during one or more modes of the post-startup operation of the aircraft engine, and the second plurality of fuel injectors are disposed circumferentially equispaced, interspersed with, and aligned to the first plurality of fuel injectors about the axis,
    wherein the second plurality of fuel injectors does not receive the hydrocarbon fuel during the initial startup operation of the turbine engine.

15. A powerplant, comprising:
- a turbine engine including a flowpath, a compressor section, a combustor section and a turbine section, the flowpath extending through the compressor section, the combustor section and the turbine section from an inlet into the flowpath to an exhaust from the flowpath, and the combustor section comprising a combustor with a combustion chamber; and
- a fuel system of the combustor section comprising a first plurality of fuel injectors and a second plurality of fuel injectors, the fuel system configured to deliver a hydrocarbon fuel only to the first plurality of fuel injectors for injection and combustion within the combustion chamber during initial startup operation of the turbine engine, the fuel system configured to deliver a non-hydrocarbon fuel to the second plurality of fuel injectors for injection and combustion within the combustion chamber during post-startup operation of the turbine engine,
- the fuel system configured to at least partially crack ammonia into hydrogen gas and nitrogen gas, the non-hydrocarbon fuel comprising the hydrogen gas or a combination of the hydrogen gas and the nitrogen gas, and
- the first plurality of fuel injectors being circumferentially equispaced, interspersed with, and aligned to the second plurality of fuel injectors about an axis.

* * * * *